(12) United States Patent
Endo et al.

(10) Patent No.: US 7,786,448 B2
(45) Date of Patent: Aug. 31, 2010

(54) IMAGING APPARATUS, METHOD FOR DRIVING THE SAME AND RADIATION IMAGING SYSTEM

(75) Inventors: Tadao Endo, Honjo (JP); Toshio Kameshima, Kumagaya (JP); Tomoyuki Yagi, Honjo (JP); Katsuro Takenaka, Honjo (JP); Keigo Yokoyama, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/488,256

(22) Filed: Jun. 19, 2009

(65) Prior Publication Data

US 2009/0256079 A1      Oct. 15, 2009

Related U.S. Application Data

(63) Continuation of application No. 11/846,054, filed on Aug. 28, 2007, now Pat. No. 7,564,038.

(30) Foreign Application Priority Data

Aug. 31, 2006   (JP) ............................. 2006-236449
Aug. 23, 2007   (JP) ............................. 2007-217265

(51) Int. Cl.
  *G01T 1/24*   (2006.01)

(52) U.S. Cl. ................................. 250/370.11
(58) Field of Classification Search .......... 250/370.01–370.15; 378/98.8
  See application file for complete search history.

(56) References Cited

U.S. PATENT DOCUMENTS

| 5,198,673 | A * | 3/1993 | Rougeot et al. | ........ 250/370.11 |
| 6,718,010 | B2 * | 4/2004 | Petrick et al. | ............... 378/98.8 |
| 2003/0038242 | A1 * | 2/2003 | Endo | ...................... 250/370.14 |
| 2005/0121616 | A1 * | 6/2005 | Petrick | ................... 250/370.09 |

\* cited by examiner

*Primary Examiner*—David P Porta
*Assistant Examiner*—Kiho Kim
(74) *Attorney, Agent, or Firm*—Fitzpatrick, Cella, Harper & Scinto

(57) ABSTRACT

For reducing extremely conspicuous line noise appearing in a picked up image with a simple configuration without complicating the configuration of an apparatus, an imaging apparatus a first sampling and holding circuit for sampling and holding an electric signal from pixels in one column of the detection unit and a second sampling and holding circuit for sampling and holding and electric signal from pixels in the other column of the detection unit, and a control unit for controlling such that the first and second sampling and holding circuits perform the sampling and holding in mutually different timings.

10 Claims, 11 Drawing Sheets

IMAGING APPARATUS, METHOD FOR DRIVING THE SAME AND RADIATION IMAGING SYSTEM

RELATED APPLICATIONS

This application is a continuation of patent application Ser. No. 11/854,054, filed Aug. 28, 2007, claims benefit of that application under 35 U.S.C. §120, claims benefit under 35 U.S.C. §119 of Japanese patent applications Nos. 2006-236449 and 2007-217265, filed Aug. 31, 2006, and Aug. 23, 2007, respectively, and incorporates the entire disclosure of each of the three mentioned prior applications by reference.

BACKGROUND OF THE INVENTION

1. Field of the Invention

The present invention relates to an imaging apparatus, a method for driving the same and a radiation imaging system suitably applicable to medical diagnosis and industrial non-destructive inspection. In the present specification, the term "radiation" includes electromagnetic waves, X-rays, γ-rays, α-rays and β-rays.

2. Description of the Related Art

An FPD capable of both photographing a still image such a radiography and radiographing a moving image such as fluoroscopic radiography and angiography with a single apparatus has been proposed in recent years. Radiographing a moving image needs to ensure a high frame rate as is not the case with photographing a still image. In general, cardioangiography requires a frame rate of 30 FPS depending on the part and the purpose of radiographing. For this reason, in radiographing a moving image, "pixel addition" is performed in which a plurality of pixels on plural rows and/or plural columns is simultaneously read out to improve an S/N ratio and to further increase the frame rate.

SUMMARY OF THE INVENTION

In radiographing by a radiation imaging apparatus, particularly in radiographing a moving image, a patient needs to be irradiated with X rays for a long time. The exposure of the patient to radiation needs to be reduced. That is to say, the dosage of exposure to radiation per frame needs to be reduced, in other words, noise in an X-ray imaging apparatus needs to be reduced, which is a problem to be solved.

In general, noise includes components caused by so-called circuit noise such as shot noise related to dark current in a radiation detection element, thermal noise in a switching element and noise in an operational amplifier forming a read out circuit. In addition to the above, there is noise transmitted thorough signal wirings (read out wirings) from the power supply of a radiation detection element and read out circuit unit and noise components getting into the signal wirings (read out wirings) through space from external noise sources. The former noise is generated independently on a pixel basis and becomes dotted noise concerning graininess in an image, which is referred to as "random noise." On the other hand, the latter noise affects the pixels and is not an independent generating phenomenon on a pixel basis. This noise commonly acts particularly on signal wirings (read out wirings) to affect image quality. In particular, driving the apparatus so that signals from a plurality of pixels in the row direction are simultaneously read out into the signal wirings (read out wirings) in the column direction brings about a peculiar horizontal linear artifact (in the row direction). This is referred to as "line noise."

In general, a random noise Nr in a radiation imaging apparatus having M-row and N-column pixels is represented by a standard deviation of M×N dark pixel data if noise included in the pixels is independently generated. However, there is peculiar fixed pattern noise resulting from a radiation detection element or switching element in a radiation detection unit, so that the random noise Nr cannot be calculated by a standard deviation of dark pixel data obtained once. Typically, dark pixel data is obtained twice and the standard deviations of data subjected to subtraction process respectively are calculated and divided by (√2) to calculate the random noise Nr.

On the other hand, the line noise N1 is obtained by calculating a standard deviation of M pieces of data in which average value is calculated on a row basis. If a peculiar fixed pattern noise exists in the read out circuit unit or pixels, the standard deviation may be similarly divided by (√2). The line noise is a characteristic horizontal linear artifact and may more significantly degrade image quality as compared with the random noise Nr.

If the standard deviation of the line noise N1 is expressed by N1≦Nr/10, the line noise N1 becomes less conspicuous on an image. For example, U.S. Pat. No. 6,952,015 describes that the line noise N1 is ≦Nr/10. Incidentally, it is extremely difficult to reduce the line noise N1.

A noise source resulting in the line noise includes for example a sensor bias source for supplying a bias to a radiation detection element. Variation in the sensor bias source for some reason generates noise on the read out wiring through the capacitance of the radiation detection unit connected between the sensor bias source and read out wiring. Typically, the sensor bias sources are capacitively coupled to the read out wirings inside the radiation detection unit. Variation in the sensor bias sources causes noise to get into the read out wirings. Furthermore, signals from the pixels are sampled and held in a capacitive element Cn for sampling and holding. Noise components caused by variation in the sensor bias sources are also sampled and held along with the signals in synchronization with a control signal instructing the timing of sampling and holding.

A noise source resulting in the line noise includes for example a power supply connected to the read out circuit unit. An operational amplifier provided in the read out circuit unit generally has an index of a power supply rejection ratio (PSRR). Variation in power supply for supplying voltage for operating the read out circuit unit and in power supply for supplying reference voltage to the operational amplifier of the read out circuit unit for some reason varies the output line of the operational amplifier An. The noise components generated by the variation are also sampled and held in synchronization with the control signal instructing the timing of sampling and holding. In other words, variation in power supply of the radiation detection unit and the read out circuit unit samples and holds part of the variation in synchronization with the control signal instructing the timing of sampling and holding.

U.S. Pat. No. 6,952,015 discloses that lowpass filters are provided between a radiation detection unit and a power supply therefor and between a read out circuit unit and a power supply therefor to decrease noise components getting into the radiation detection unit or the read out circuit unit from the power supply.

A noise source resulting in the line noise includes, for example, an externally originated noise source existing outside the radiation generating apparatus. The externally originated noise source includes, for example, a high voltage power source of a radiation generating apparatus, an ignition coil of a vehicle, a thunderbolt phenomenon, a motor driving in the neighbor and MRI and CT device operated in the next room in the hospital. The externally originated noise from the externally originated noise source propagates through space, transmitted into the read out wiring and GND line, and sampled and held in a capacitive element at timing of the control signal instructing the timing of sampling and holding with signals from pixels.

The above externally originated noise superimposes the line noise onto the output signal (Vout) output from the amplifier. The externally originated noise turns into a horizontal linear line noise in the row direction to significantly degrade image quality. Particularly, in radiographing a moving image, dosage of exposure to radiation (X-ray dose) is a little to cause a problem in that the line noise becomes conspicuous.

U.S. Patent Application Publication No. 2003/0190088 discloses an imaging apparatus in which a line noise detecting unit for detecting whether a line noise exists from the imaging output of a two dimensional area sensor stored in a memory circuit is provided to calculate the output quantity of the line noise, remove the line noise from the imaging output and correct the imaging output.

In U.S. Patent Application Publication No. 2003/0190088, the output of the line noise is calculated from the average of the row output. Particularly in an apparatus including a radiation detecting unit with an area as large as 40 cm×40 cm, the line noise generated on a row basis may have shading. In this case, correct correction value as the quantity of line noise to be corrected may not be indicated. If a calculation method in consideration of the above-mentioned is used and if it takes a long time to calculate, a problem arises in that it becomes difficult to correct the line noise in real time. A complicated algorithm has a drawback in that the load of apparatus development becomes large to increase the cost.

U.S. Pat. No. 6,734,414 discloses an imaging apparatus in which a gate wiring is connected to pixels not on a row basis but at random. In U.S. Pat. No. 6,734,414, a horizontal linear line noise will not be generated on the principle of wiring. However, output signal charges are not regular and it is required to rearrange signals in the processing circuit at the rear stage, which complicates processing. Furthermore, the gate wiring is complicated, which may decrease a production yield to cause a problem of an increase in cost.

That is to say, in a radiation imaging apparatus of conventional FPD type, it has been difficult to reduce an extremely conspicuous line noise appearing in a picked up image with a simple configuration without complicating the configuration of an apparatus.

The present invention has been made in view of the above-mentioned problems and has for its purpose to provide a radiation imaging apparatus capable of reducing an extremely conspicuous line noise appearing in a picked up image with a simple configuration without complicating the configuration of an apparatus, a method of driving the same and a radiation imaging system.

An imaging apparatus of the present invention has a detection unit including a plurality of pixels arranged in row and column directions, wherein each of the pixels includes a conversion element for converting an incident radiation or an incident light into an electric charge and a switch element for transferring an electric signal corresponding to the electric charge, a drive circuit unit for driving a plurality of the switch elements arranged in the row direction to transfer the electric signals in parallel from the pixels arranged in the row direction, a read out circuit unit for reading out the electric signals in parallel, wherein the read out circuit unit comprises a first sampling and holding circuit for sampling and holding an electric signal from pixels arranged along one column of the detection unit, and a second sampling and holding circuit for sampling and holding and an electric signal from pixels arranged along another column of the detection unit, and a control unit for controlling the read out circuit unit, such that the first and second sampling and holding circuits perform the sampling and holding in mutually different timings.

A radiation imaging system of the present invention has the radiation imaging apparatus and a radiation generating apparatus for emitting the radiation to the detection unit.

A method for driving a radiation imaging apparatus of the present invention having a detection unit including a plurality of pixels arranged in row and column directions, wherein each of the pixels includes a conversion element for converting an incident radiation or an incident light into an electric charge and a switch element for transferring an electric signal corresponding to the electric charge, a drive circuit unit for driving a plurality of the switch elements arranged in the row direction to transfer the electric signals in parallel from the pixels arranged in the row direction, and a read out circuit unit for reading out the electric signals in parallel, wherein the read out circuit unit comprises a first sampling and holding circuit for sampling and holding an electric signal from pixels arranged along one column of the detection unit, and a second sampling and holding circuit for sampling and holding and an electric signal from pixels arranged along another column of the detection unit, the method comprises a step of controlling the read out circuit unit, such that the first and second sampling and holding circuits perform the sampling and holding in mutually different timings.

According to the present invention, it is enabled to reduce extremely conspicuous line noise appearing in a picked up image with a simple configuration without complicating the configuration of an apparatus.

Further features of the present invention will become apparent from the following description of exemplary embodiments with reference to the attached drawings.

DESCRIPTION OF THE EMBODIMENTS

The embodiments of the present invention are described in detail below with reference to the accompanying drawings.

First Embodiment

Figure 1:
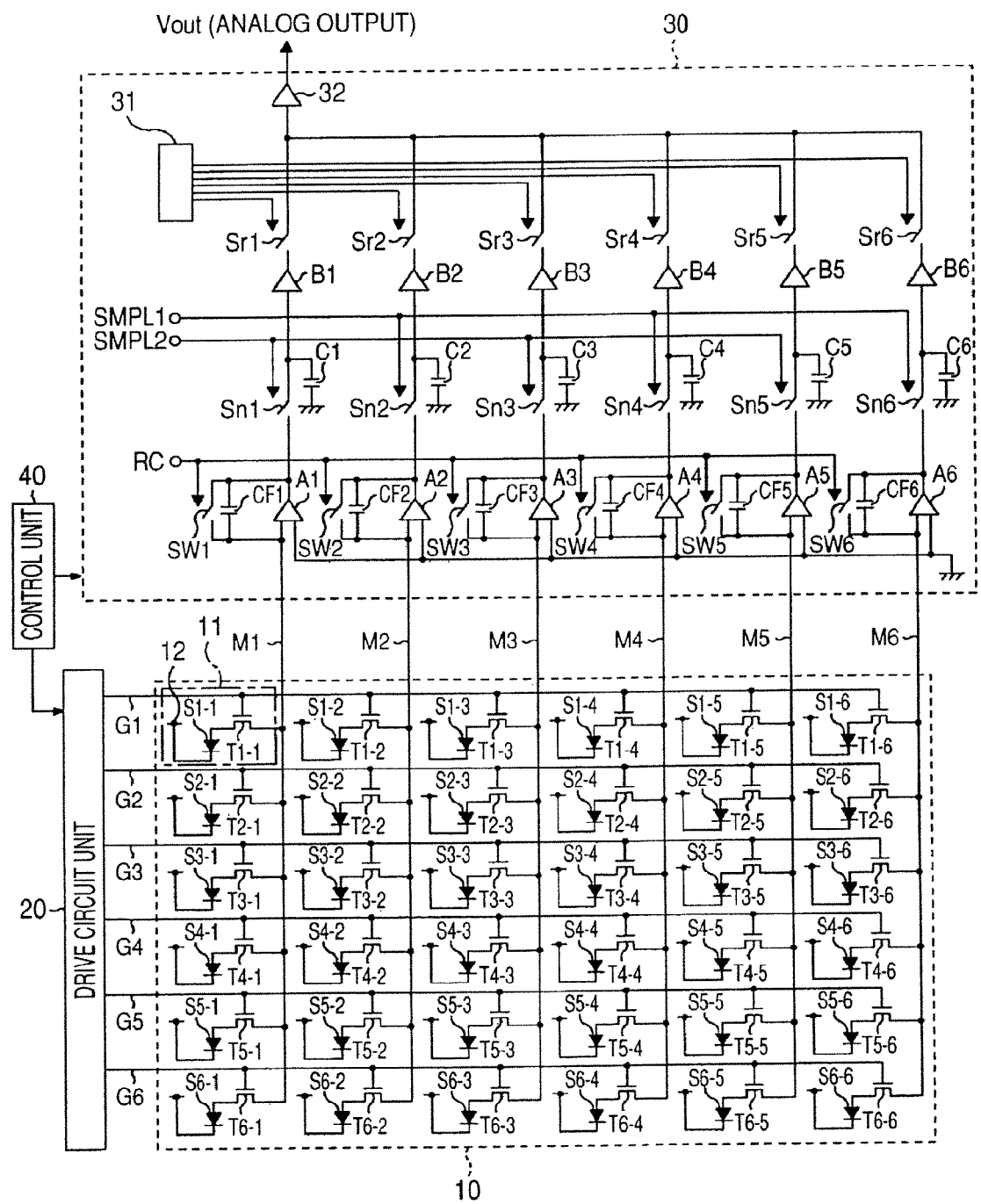
FIG. 1 is a schematic diagram of a radiation imaging apparatus (an X ray imaging apparatus) according to a first embodiment.

FIG. 1 is a schematic diagram of a radiation imaging apparatus (an X ray imaging apparatus) according to a first embodiment. The radiation imaging apparatus according to the first embodiment includes a radiation detection unit 10 for detecting an incident radiation, drive circuit unit 20 for driving the pixels 11 of the radiation detection unit 10, read out circuit unit 30 for reading out electric charges (or electric signals) from the pixels 11 and control unit 40 for controlling the operation of the drive circuit unit 20 and the read out circuit unit 30.

A plurality of the pixels 11 is arranged two-dimensionally in row and column directions on the radiation detection unit 10. For the sake of simplifying description, 36 pixels 11 (6×6, 6 channels) are illustrated in FIG. 1, actually however, the radiation detection unit 10 is formed of multiple channels including much more pixels. For example, the radiation detection unit 10 with a light receiving area of 40 cm×40 cm needs to satisfy a resolution of substantially 200 μm pitch or lower to image the thorax of human body for medical purpose. If a light receiving area is 40 cm×40 cm and a resolution is 200 μm pitch, the number of pixels is equal to 2000× 2000=4,000,000 pixels. In this case, the number of read out wirings is 2000. Electric charges of pixels in the radiation detection unit 10 are divided to be read out by several read out circuit units. Typically, the number of channels in the read out circuit is, for example, 64, 128 or 256 and is selected according to production yield or man hour.

In FIG. 1, radiation detection elements (or conversion elements) S1-1 to S6-6 convert an incident radiation into an electric charge and are biased by sensor bias sources 12. Switch elements T1-1 to T6-6 transfer electric signals corresponding to the electric charges of the radiation detection elements S1-1 to S6-6 to the read out circuit unit 30 and are formed of thin film transistors (TFT), for example. Gate wirings (or drive wirings) G1 to G6 serve to drive the switch elements T1-1 to T6-6 and are arranged to be commonly connected to the switch elements of a plurality of the pixels in the row direction. Read out wirings M1 to M6 serve to read out electric signals corresponding to the electric charges of the radiation detection elements S1-1 to S6-6 through the switch elements T1-1 to T6-6 and are arranged to be commonly connected to the switch elements of a plurality of the pixels in the column direction.

The radiation detection elements S1-1 to S6-6 are categorized into two types: direct and indirect conversion type. A radiation detection element of the direct conversion type is formed of, for instance, amorphous selenium, lead iodide, mercuric iodide, cadmium telluride, gallium arsenide, gallium phosphide or zinc sulfide as a main ingredient and directly converts an incident radiation (X ray) into an electric signal by the main ingredient. On the other hand, a radiation detection element of the indirect conversion type includes phosphor (or a wavelength converter) for converting an incident radiation (X ray) into a visible ray and a photoelectric conversion element for converting the visible ray converted by the phosphor into an electric charge (or an electric signal).

The phosphor in the radiation detection element of the indirect conversion type is arranged in substantially close contact with the photoelectric conversion element. The phosphor is formed of, for example, $Gd_2O_2S$, $Gd_2O_3$ or CsI as a main ingredient. The photoelectric conversion element is formed of, for example, amorphous silicon as a main ingredient. The radiation detection elements both of the direct and the indirect conversion type can realize a wide and thin radiation detection unit 10 to embody an FPD, which permits significantly reducing a time period from capture to obtainment of an image.

The switch elements T1-1 to T6-6 are driven by the drive circuit unit 20 through the gate wirings G1 to G6 in the row direction. The read out wirings M1 to M6 are connected to the read out circuit 30. The electric signals of the radiation detection elements S1-1 to S6-6 are read out by the read out circuit unit 30 through the read out wirings M1 to M6. The pixel 11 includes a single radiation detection element, a single switch element and a single sensor bias source 12.

Operational amplifiers A1 to A6 function as integrators by configuring capacitive elements CF1 to CF6 as illustrated in FIG. 1. Switches SW1 to SW6 reset integral charges of the capacitive elements CF1 to CF6 according to RC control signals.

Capacitive elements C1 to C6 sample and hold the electric signals of the operational amplifiers A1 to A6. Turning on or off switches Sn1 to Sn6 samples and holds the electric signals. The switch Sn1 and the capacitive element C1 form a sampling and holding circuit corresponding to the read out wiring M1 and the switch Sn2 and the capacitive element C2 form a sampling and holding circuit corresponding to the read out wiring M2. These sampling and holding circuits equal in number to the read out wirings altogether form a sampling and holding circuit unit. In the present embodiment, the switches Sn1, Sn3 and Sn5 out of the switches Sn1 to Sn6 are turned on or off by an SMPL1 control signal of a control unit 40. The switches Sn2, Sn4 and Sn6 out of the switches Sn1 to Sn6 are turned on or off by an SMPL2 control signal of the control unit 40.

Buffer amplifiers B1 to B6 correctly transfer the electric potentials of the capacitive elements C1 to C6. Applying signals from a shift register 31 to switches Sr1 to Sr6 converts the parallel signals of the buffer amplifiers B1 to B6 into series signals and the series signals are output through an amplifier 32.

The present embodiment is characterized in that add channels (or, add read out wirings M1, M3 and M5) and even channels (or, even read out wirings M2, M4 and M6) are independently controlled by the SMPL1 and the SMPL2 control signals respectively. That is to say, the channels can be controlled in a temporally offset manner.

Figure 2:
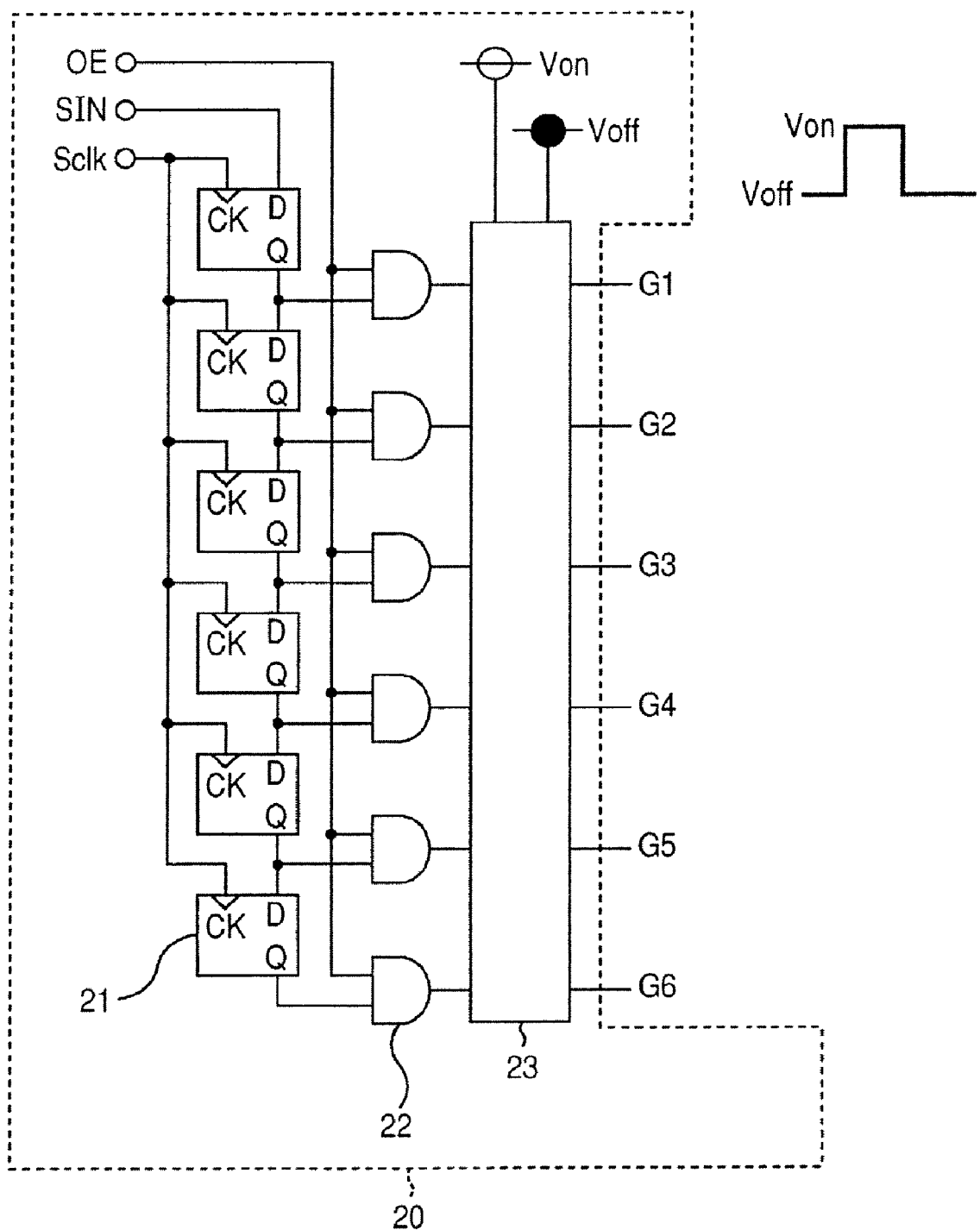
FIG. 2 is a schematic diagram illustrating one example of a detail internal configuration of the drive circuit unit illustrated in FIG. 1.

The internal configuration of the drive circuit unit 20 is described below. FIG. 2 is a schematic diagram of one example of a detail internal configuration of the drive circuit unit 20 illustrated in FIG. 1. The drive circuit unit 20 includes a plurality of D flip-flops 21, a plurality of AND elements 22 and level shift circuits 23. Configuring each constituent as illustrated in FIG. 2 forms the drive circuit unit 20.

The drive circuit unit 20 is controlled by three control signals OE, SIN and Sclk from the control unit 40. In general, the D flip-flop 21 and the AND element 22 are digital circuits. The input and output voltages thereof are related to processes for producing the constituents. In general, the input and the output voltage of a logic Hi have been a five-volt system, however, a recent requirement for low consumption power and advancement in process technique have released a device operating by a 3.3-volt system or by a voltage lower than that.

However, in general, the switches for the radiation detection unit 10 are formed of, for example, amorphous silicon as a main gradient. The drive voltage thereof is desirably five volts or higher in a current process technique for producing a TFT made of amorphous silicon. For this reason, the level shift circuit 23 is provided to convert a drive voltage into one having a voltage level adapted to the characteristic of TFT made of amorphous silicon.

Figure 3:
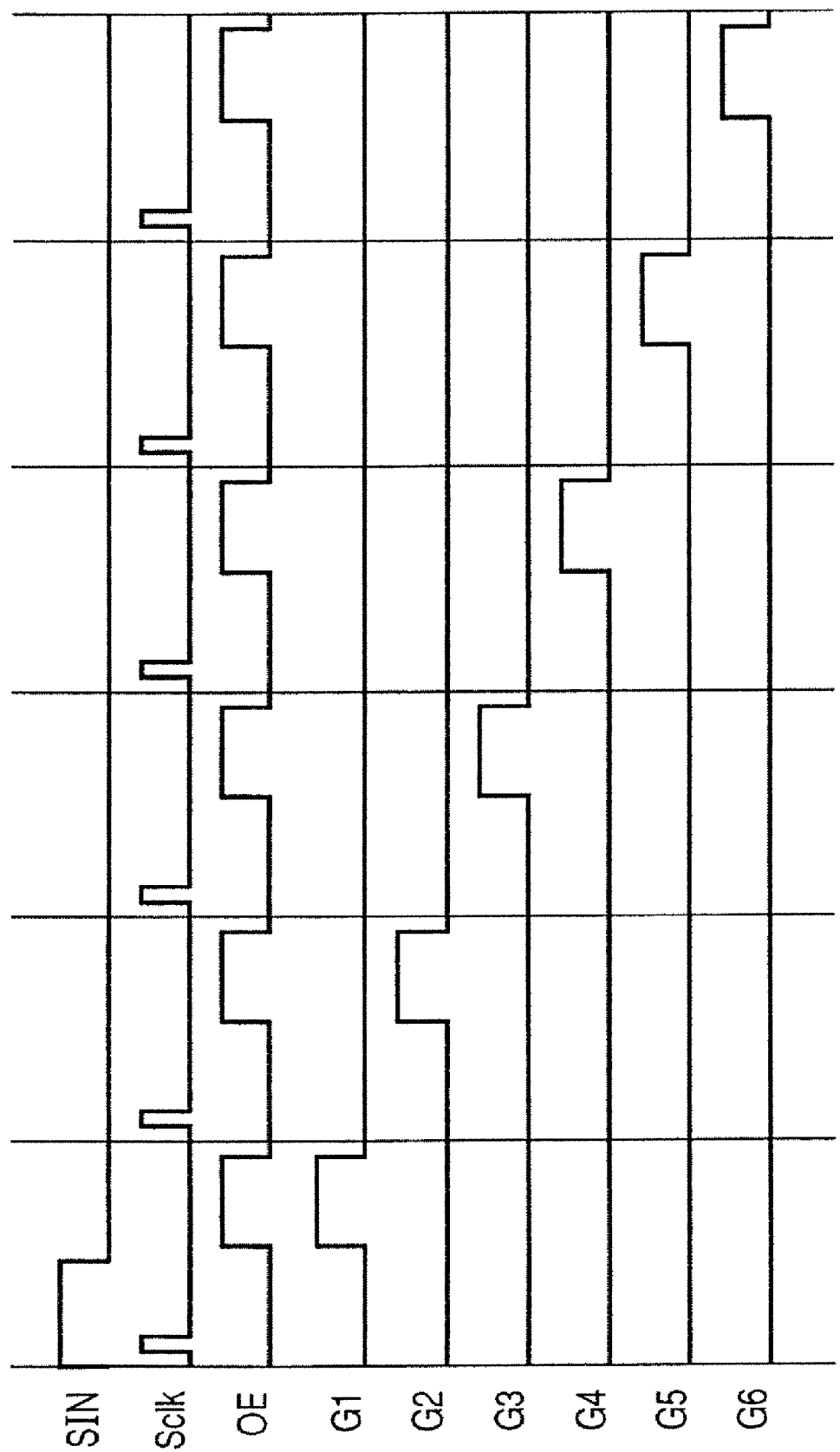
FIG. 3 is a timing chart illustrating one example of operation of the drive circuit unit illustrated in FIG. 2.
Figure 4:
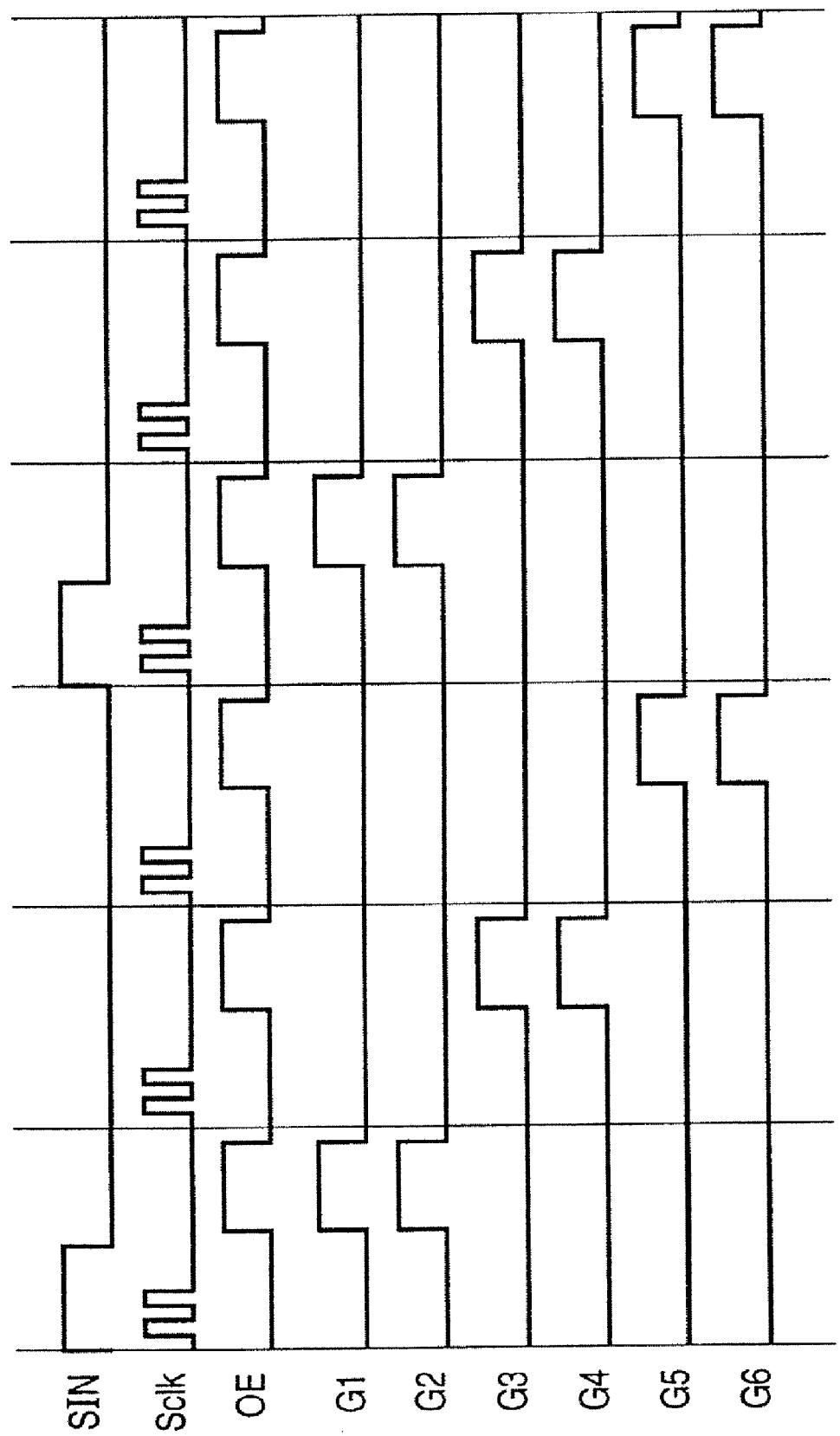
FIG. 4 is a timing chart illustrating one example of operation of the drive circuit unit illustrated in FIG. 2.
Figure 5:
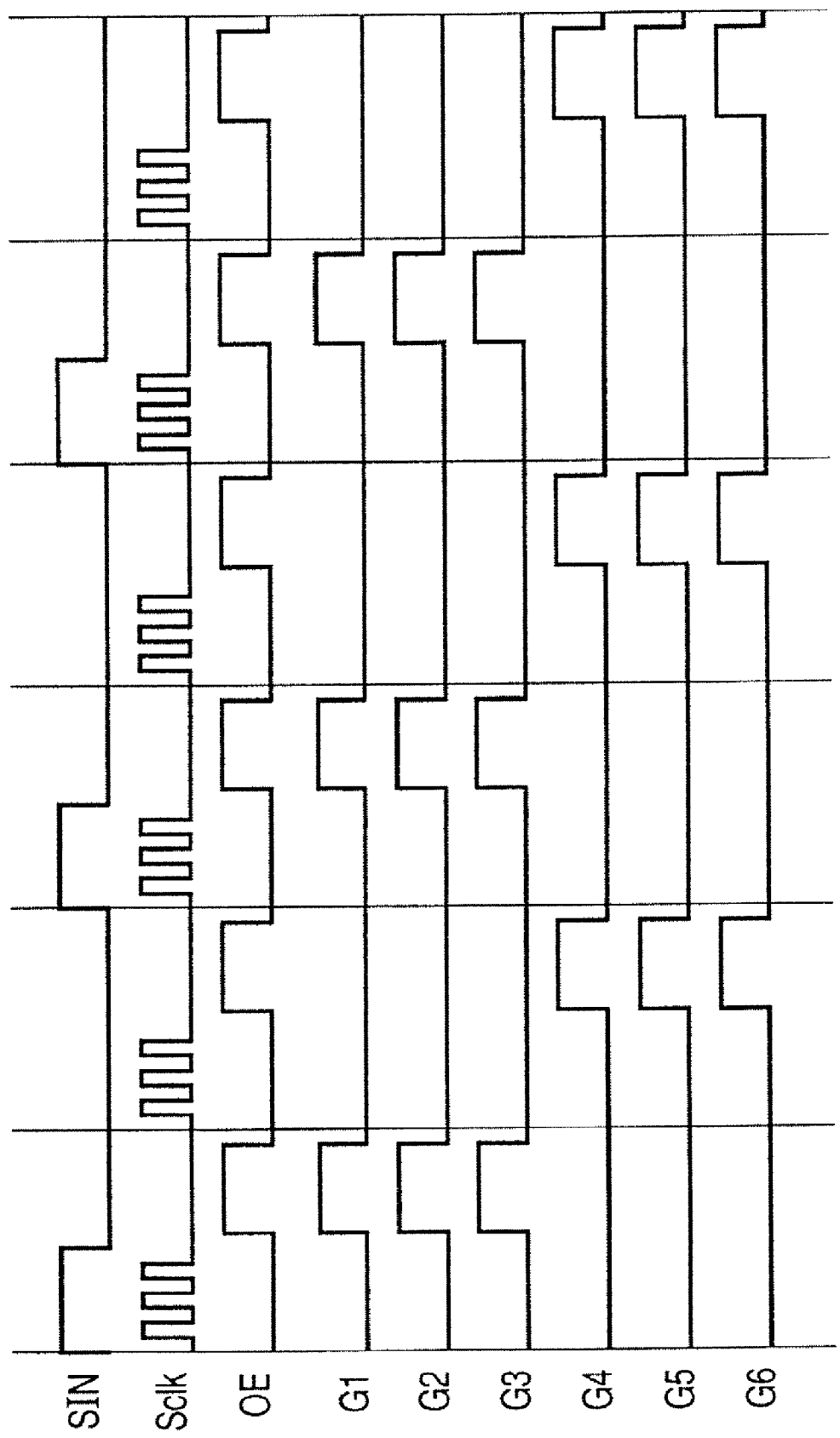
FIG. 5 a timing chart illustrating one example of operation of the drive circuit unit illustrated in FIG. 2.

FIGS. 3 to 5 are timing charts illustrating one example of operation of the drive circuit unit 20 illustrated in FIG. 2 respectively. FIG. 3 illustrates the case where the outputs of gate wirings G1 to G6 in the level shift circuit 23 are shifted step by step according to the Sclk control signal.

FIG. 4 illustrates the case where the gate wirings G1 and G2 are simultaneously driven in the level shift circuit 23, then the gate wirings G3 and G4 are simultaneously driven, and then the gate wirings G5 and G6 are simultaneously driven according to the Sclk control signal. The operation illustrated in FIG. 4 intends to perform an operation at the time of reading out the signal charges of the pixels illustrated in FIG. 1 with two pixels added in a column direction. In this case, a pixel pitch is as large as two times and a drive time is halved.

FIG. 5 illustrates the case where the gate wirings G1 to G3 are simultaneously driven in the level shift circuit 23 and then the gate wirings G4 to G6 are simultaneously driven according to the Sclk control signal. This operation intends to perform an operation at the time of reading out the signal charges of the pixels with three pixels added in the row direction. In this case, a pixel pitch is as large as three times and a drive time is reduced to a third.

Figure 6:
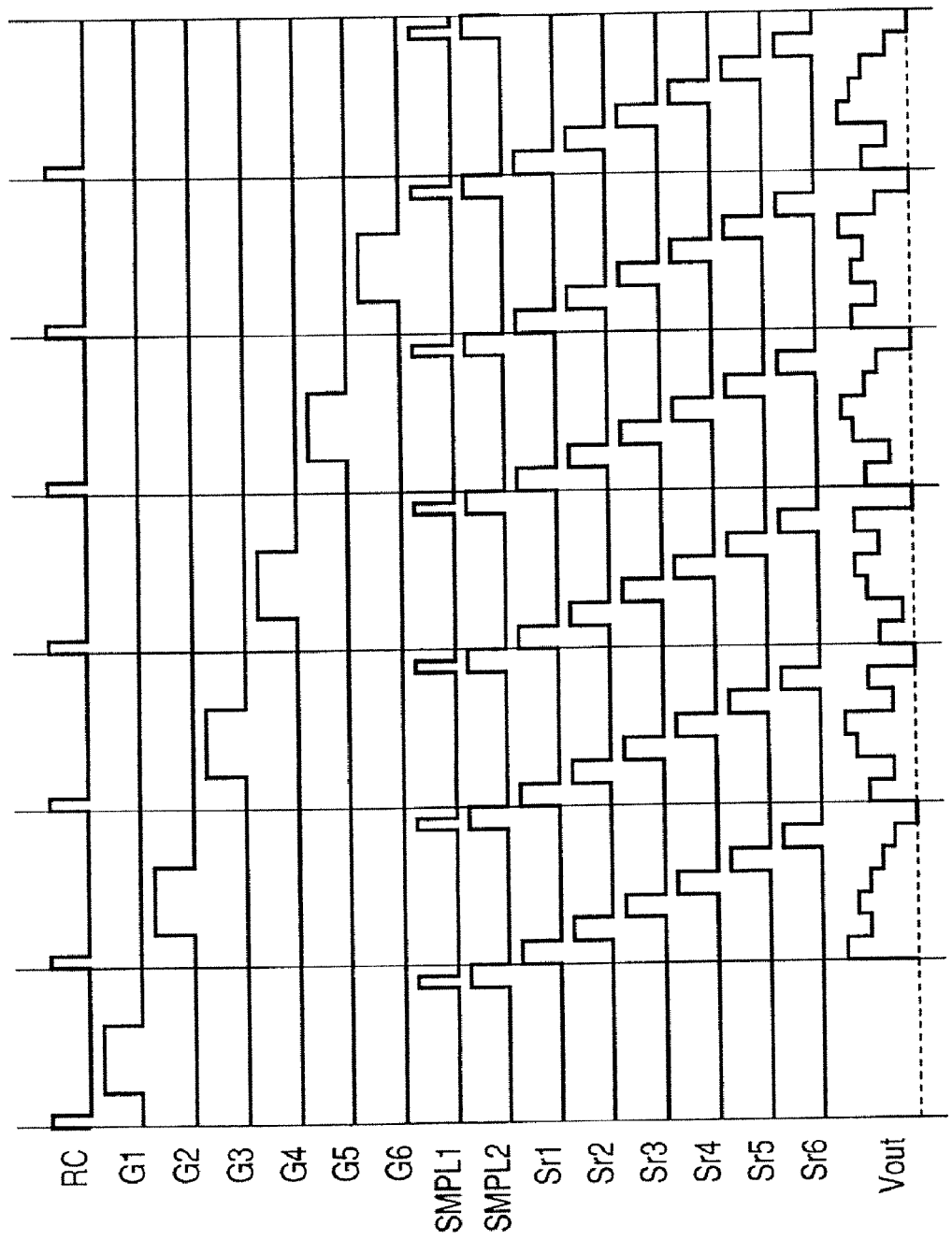
FIG. 6 is a timing chart illustrating one example of operation of the radiation imaging apparatus according to the first embodiment.

The operation of the radiation imaging apparatus according to the first embodiment is described below. FIG. 6 is a timing chart illustrating one example of operation of the radiation imaging apparatus according to the first embodiment.

First, operation related to the pixels on the first row in the radiation detection unit 10 is described. The switch elements T1-1 to T1-6 on the first row are turned on by the drive signal from the drive circuit unit 20 to the gate wiring G1. The signal charges photoelectrically converted by the radiation detection elements S1-1 to S1-6 on the first row are read out through the read out wirings M1 to M6 and input into the read put circuit unit 30. Specifically, the signal charges on the first row photoelectrically converted by the radiation detection elements S1-1 to S1-6 are input into the operational amplifiers A1 to A6 respectively (transfer operation).

As a result, the signal charges input into the operational amplifiers A1 to A6 are stored in the capacitive elements CF1 to CF6. After that, the SMPL1 and the SMPL2 control signals are input from the control unit 40 in different timing periods and the signal charges are collectively transferred to the capacitive elements C1 to C6 for sampling and holding respectively. When the switches Sr1 to Sr6 receive from the shift register 31 signals for causing the switches Sr1 to Sr6 to be sequentially turned on, parallel data in the signals of the capacitive elements C1 to C6 are rearranged into series data in time-series to be output from the amplifier 32 as analog signals for one row (series conversion operation).

Secondly, the operation related to the pixels on the second row in the radiation detection unit 10 is described. In the configuration illustrated in FIG. 1, the signal charges related to the pixels on the first row are sampled and held in the capacitive elements C1 to C6 by the SMPL1 and the SMPL2 control signals and thereafter the transfer operation is allowed of the signal charges related to the pixels on the second row. In other words, the capacitive elements CF1 to CF6 are reset by the RC control signal and thereafter the transfer operation is performed by driving the gate wiring G2 and then the foregoing series conversion operation is performed. The same operation is repeated related to the pixels on the third row and the following. That is to say, in the configuration illustrated in FIG. 1, the presence of the sampling and holding circuit simultaneously enables the transfer operation on the n-th row and the series conversion operation on the (n+1)-th row.

In the present embodiment, the SMPL1 and the SMPL2 control signals are supplied from the control unit 40 and independently control the odd channels (or, the odd read out wirings M1, M3 and M5) and the even channels (or, the even read out wirings M2, M4 and M6) respectively. In other words, in the present embodiment, timing in sampling and holding is offset between the odd and the even channels so that the quantity of noise superimposed on the odd and the even channels is different.

Thus, the timing in sampling and holding is offset to cause the sampling and holding operation of the odd and the even channels to be independent. If the frequency range of externally originated noise and power supply noise is from the pulse width of sampling and holding to the order of one-line operating time, the quantities of noise superimposed on the odd and the even channels are different, so that line noise exerts less influence, producing an excellent image with less line noise. On the other hand, externally originated noise and power supply noise which are sufficiently longer in time range (low frequency) as compared with one-line operating time are small in separation of noise superimposed on the odd and the even channels, which is less effective for improvement in image quality.

In the present embodiment, the externally originated noise and power supply noise are generally transferred in an alternating-current phenomenal manner, so that the action of an image on a black and a white side is randomly superimposed between the odd and the even channel to reduce a horizontal linear artifact (or line noise).

In general, the random noise Nr in the radiation imaging apparatus with M-row and N-column pixels, as described above, is represented by standard deviation of M×N dark pixel data if noises included in the pixels are independently generated. However, there is a peculiar fixed pattern noise generated from radiation detection elements and switch elements in the radiation detection unit 10, so that the random noise Nr cannot be calculated by standard deviation of dark pixel data obtained at one time. Typically, dark pixel data is obtained twice and the standard deviations of the data subjected to subtraction process respectively are calculated and divided by ($\sqrt{2}$) to obtain the random noise Nr.

On the other hand, as described above, the line noise Nl is obtained by calculating the standard deviations of M pieces of data in which average value is calculated on a row basis. If a peculiar fixed pattern noise exists in the read out circuit unit or the pixels, the standard deviation may be similarly divided by ($\sqrt{2}$). The random noise Nr and the line noise Nl are different in source from each other. The line noise Nl is more sensitive than the random noise Nr in image quality. The line noise Nl is caused by the sampling and holding operation and reset operation being performed on a line (row) basis. Our experience indicates that if $Nl \leq Nr/10$, the line noise Nl becomes inconspicuous on an image and is not a problem any longer.

In the present embodiment, the quantity of line noise in itself only on the odd channel is not reduced and the quantity of line noise in itself only on the even channel is not reduced either. If they are independent, the line noise is equal to $Nl/(\sqrt{2})$ for the case where the line noise is calculated on a row basis.

According to the present embodiment, it is enabled to reduce extremely conspicuous line noise appearing on a picked up image with a simple configuration without complicating the configuration of the apparatus.

In the present embodiment, as illustrated in FIG. 6, the relation on timing between the SMPL1 and the SMPL2 control signals being the sampling and holding signals is the same on a row basis. In this respect, the relation on timing between the SMPL1 and the SMPL2 control signals may be changed every row, for example. In other words, in the present embodiment, the control signals may be fed into the sampling and holding circuits corresponding to the predetermined read out wirings and into the sampling and holding circuits corresponding to read out wirings different from the predetermined read out wirings respectively such that the sampling and holding circuits perform the sampling and holding in mutually different timings. The timing may be different at the start of the sampling and holding or at the end of the sampling and holding.

In FIG. 6, although the drive circuit unit 20 inputs the drive signal into the gate wiring G1 to G6 one by one to be read out, the drive circuit unit 20 may simultaneously input the drive signals into n-gate wirings G1 to G6 (where, n≧2). In this case, the pixels connected to the n-drive wirings are simultaneously driven, and the read out circuit unit 30 reads out added electric charges (or electric signals) in the n-pixels per each read out wiring.

In the present embodiment, although the sampling and holding signals are separated into two systems of the odd and the even channels and input, the following mode may be used.

As a first mode, N is taken to be a natural number and the control unit 40 inputs the sampling and holding signals different in drive timing from each other into three systems of read out wirings (3N) column, (3N−1) column and (3N−2) column. This enables further enhancing an effect of reduction in line noise.

As a second mode, N is taken to be a natural number and the control unit 40 inputs the sampling and holding signals different in drive timing from each other into four systems of read out wirings (4N) column, (4N−1) column, (4N−2) column and (4N−3) column. This enables still further enhancing an effect of reduction in line noise.

As a third mode, a plurality of analog multiplexers including the shift register 31 and the switches Sr1 to Sr6 are provided, and the control unit 40 inputs the sampling and holding signals different in drive timing from each other into each of the analog multiplexers. This enables further enhancing an effect of reduction in line noise.

That is to say, in the present invention, a plurality of the read out wirings is separated into a plurality of read out wiring groups. Control signals for controlling the read out circuit unit 30 may be fed into the read out circuit unit 30 such that the sampling and holding circuits corresponding to the predetermined read out wiring groups and the sampling and holding circuits corresponding to read out wiring groups different from the predetermined read out wiring groups perform the sampling and holding in mutually different timings.

Providing a large number of control wirings for the control signals input from the control unit 40 to disperse line noises is more effective for an improvement in image quality, however, providing the control wirings in a blind way increases the area of the read out circuit unit 30, resulting in decrease in yield. This also complicates the control by the control unit 40, which may increase the cost of the apparatus. Thus, the appropriate number of the systems is up to four with consideration for the above.

Second Embodiment

Figure 7:
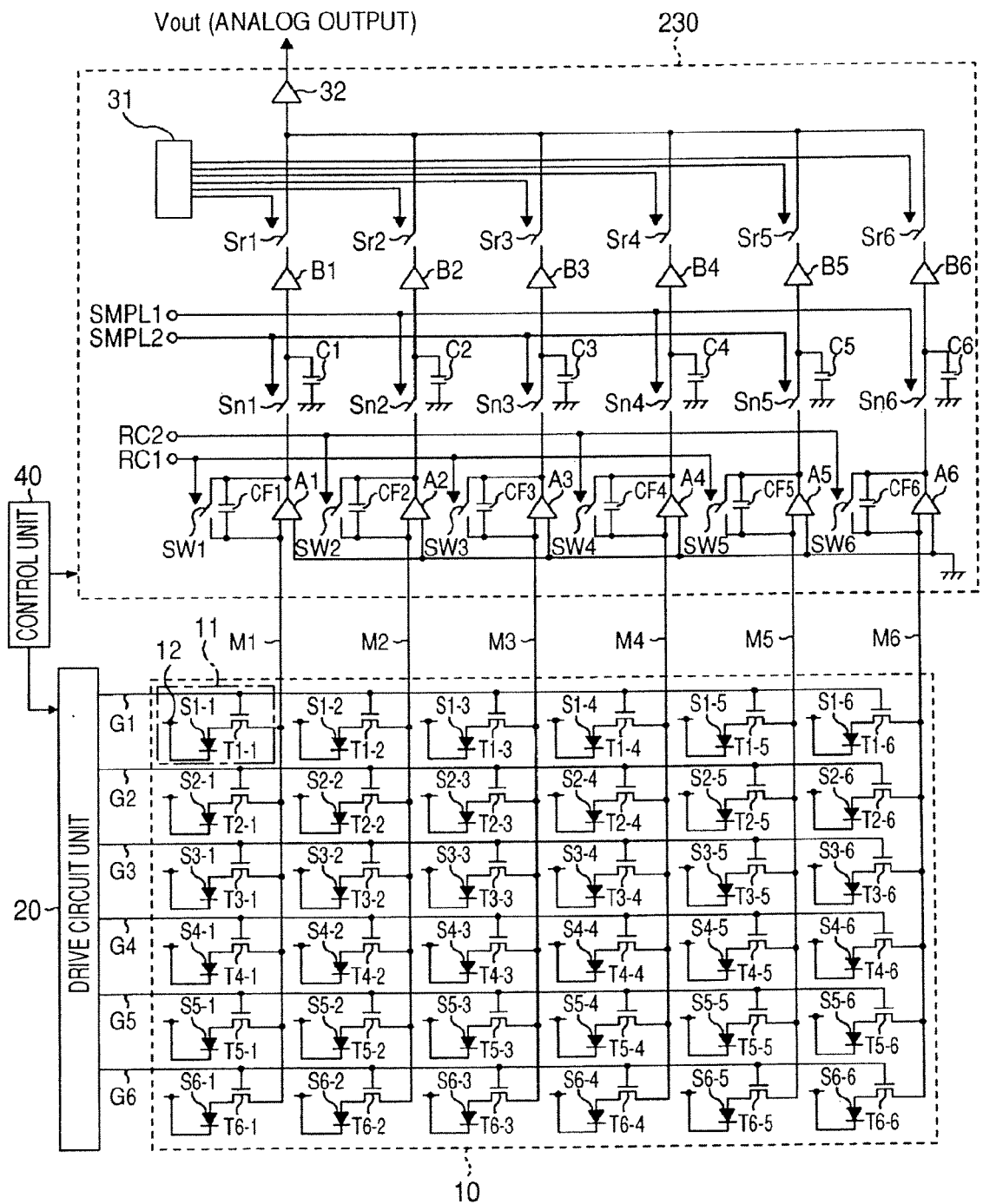
FIG. 7 is a schematic diagram of a radiation imaging apparatus (an X ray imaging apparatus) according to a second embodiment.

The second embodiment of the present invention is described below. FIG. 7 is a schematic diagram of a radiation imaging apparatus (an X ray imaging apparatus) according to the second embodiment. In FIG. 7, the same constituents as those of the first embodiment are denoted by the same reference characters and numbers, and detailed description thereof is omitted because functions thereof are the same as those described in the first embodiment.

The second embodiment is different from the first embodiment in the configuration of the read out circuit unit 230. In the second embodiment, as is the case with the first embodiment, the odd and the even channels are independently controlled by the SMPL1 and the SMPL2 control signals respectively, and in addition to the above, the odd and the even channels are independently controlled by the RC1 and the RC2 control signal respectively. That is, when reset is performed, the control unit 40 inputs the RC1 control signal into the odd channel of the read out circuit unit 230 and the RC2 control signal into the even channel thereof. By shifting reset timings, reset operations of the odd and even channels are set as independent events. Accordingly, when frequency range of an externally originated noise and a power source noise is approximately within a range from a reset pulse width to an operation time of one line, a quantity of noise superimposed on the add channel and a quantity of noise superimposed on the odd channel are different at the reset. Thereby, an effect due to the line noise is suppressed, to provide an excellent image of no line noise. According to the present embodiment, since the externally originated noise and the power source noise are in generally transmitted as an event of an alternating current, tendencies to white and to black in the image are superimposed at random on the even and odd channels, thereby reducing the horizontal liner artifact (line noise).

Figure 8:
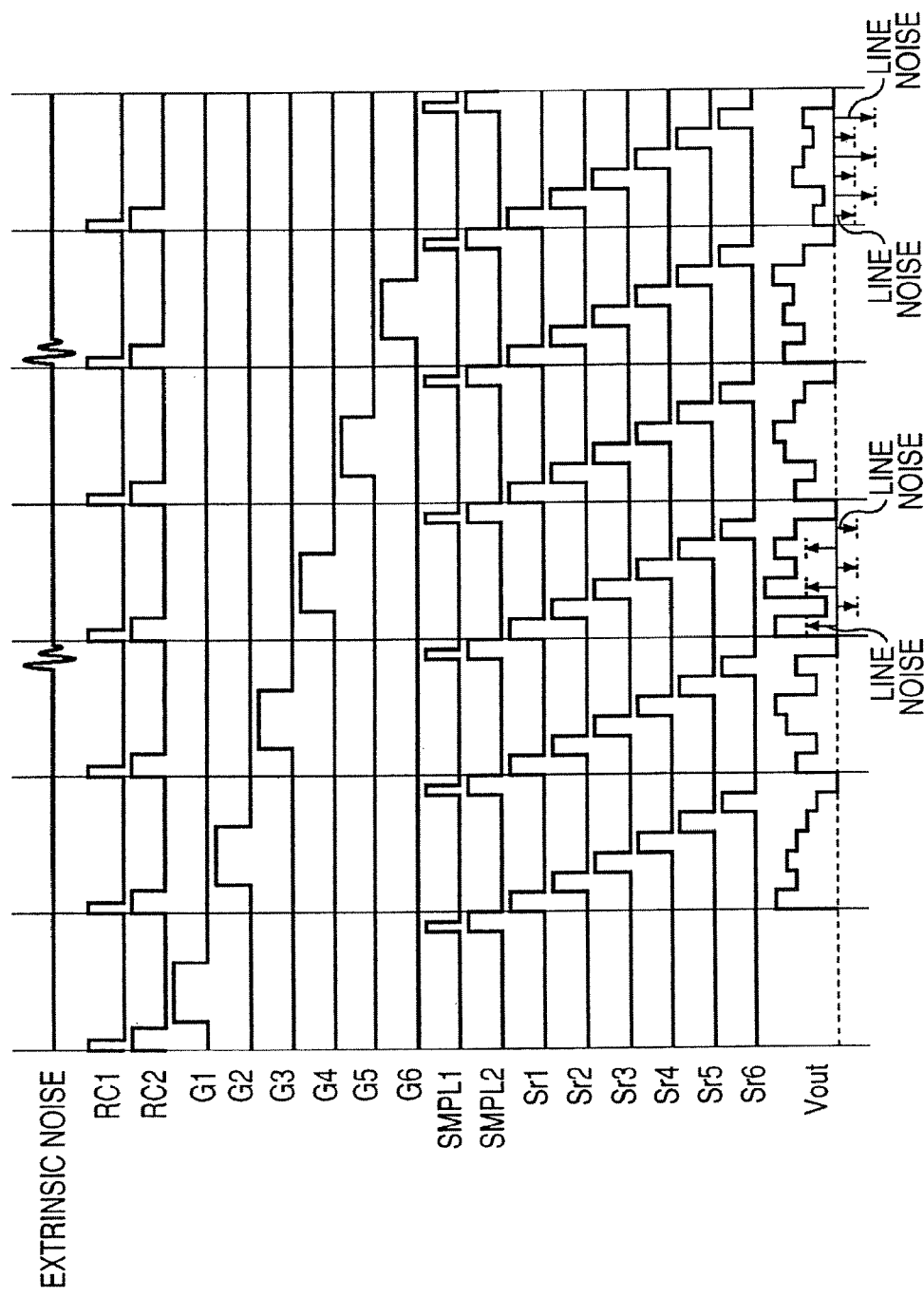
FIG. 8 is a timing chart illustrating one example of operation of the radiation imaging apparatus according to the second embodiment.

The operation of the radiation imaging apparatus according to the second embodiment is described below. FIG. 8 is a timing chart illustrating one example of operation of the radiation imaging apparatus according to the second embodiment. FIG. 8 illustrates an example where an externally originated noise gets into the apparatus.

As described above, as is the case with the SMPL1 and the SMPL2 control signals, the RC1 and the RC2 control signal are supplied from the control unit 40 for controlling timing for operating the apparatus and independently control the odd and the even channels respectively. In the present embodiment, the timing in sampling and holding and in reset is offset so that the quantity of noise superimposed on the odd and the even channels is different, thereby reducing the line noise to improve image quality.

In the timing chart in FIG. 8, externally originated noises are generated at the period when the SMPL1 and the SMPL2 sampling and holding signals on the third row are output and at the period when the RC1 and the RC2 reset signals on the six row are output, and superimposed on the output signals Vout as a line noise.

As illustrated in FIG. 8, the read out circuit unit 230 is driven based on the SMPL1 and the SMPL2 control signals, so that the line noises different in quantity between the odd and the even channels are superimposed on the output signal on the third row. The read out circuit unit 230 is driven based on the RC1 and the RC2 control signals, so that line noises different in quantity between the odd and the even channels are superimposed on the output signal on the six row. In FIG. 8, the timing chart is drawn with the signal components included, so that the line noises are indicated by broken lines.

Line noises generated by sources of noise caused by variation in the power supplies of the radiation detection unit 10 and the read out circuit unit 230 and sources of noise passing through space are a phenomenon independent from reset by the RC1 and the RC2 and the sampling and holding by the SMPL1 and the SMPL2. It is unclear whether or not the line noise is on the white side or on the black side. A noteworthy distinction for the present embodiment is that both the sampling and holding operations and both the reset operations between the odd and the even channels are separated and independently operated, thereby stochastically improving image quality.

In the present embodiment, the reset operation and the sampling and holding operation are operated in different timing between the odd and the even channels. This may increase the possibility of dispersion of the noises superimposed on the odd and the even channels as compared with the case of the first embodiment to allow extremely conspicuous line noises appearing on a pickup image to be reduced.

In the present embodiment, the relation on timing between the SMPL1 and the SMPL2 control signals being sampling and holding signals and the relation on timing between the RC1 and the RC2 control signals being reset signals are the same on a row basis. In this respect, the relation on timing between the SMPL1 and the SMPL2 control signals and between the RC1 and the RC2 control signals may be changed every row, for example. That is to say, in the present embodiment, the control signals may be fed into the reset unit corresponding to the predetermined read out wirings and the reset unit corresponding to read out wirings different from the predetermined read out wirings such that the reset units reset in mutually different timings. The timing may be different at the start of the reset or at the end of the reset.

In FIG. 8, although the drive circuit unit 20 inputs drive signals into the gate wiring G1 to G6 one by one to be read out, the drive circuit unit 20 may simultaneously input the drive signals into n-gate wirings G1 to G6 (where, $n \geq 2$). In this case, the pixels connected to the n-drive wirings are simultaneously driven, and the read out circuit unit 230 reads out added electric charges (or electric signals) in the n-pixels per each read out wiring.

In the present embodiment, although the sampling and holding signals and the reset signals are separated into two systems of the odd and the even channels and input, the following mode may be used.

As a first mode, N is taken to be a natural number and the control unit 40 inputs the sampling and holding signals and the reset signals different in drive timing from each other into three systems of read out wirings (3N) column, (3N−1) column and (3N−2) column. This enables further enhancing an effect of reduction in line noise.

As a second mode, N is taken to be a natural number and the control unit 40 inputs the sampling and holding signals and the reset signals different in drive timing from each other into four systems of read out wirings (4N) column, (4N−1) column, (4N−2) column and (4N−3) column. This enables still further enhancing an effect of reduction in line noise.

As a third mode, a plurality of analog multiplexers including the shift register 31 and the switches Sr1 to Sr6 are provided, and the control unit 40 inputs the sampling and holding signals and the reset signals different in drive timing from each other into each of the analog multiplexers. This enables further enhancing an effect of reduction in line noise.

That is to say, in the present invention, a plurality of read out wirings is separated into a plurality of read out wiring groups. Control signals for controlling the read out circuit unit 230 may be fed into the read out circuit unit 30 such that the reset unit corresponding to the predetermined read out wiring groups and the reset unit corresponding to read out wiring groups different from the predetermined read out wiring groups reset in mutually different timings.

Providing a large number of control wirings for the control signals input from the control unit 40 to disperse line noises is more effective for an improvement in image quality, however, providing the control wirings in a blind way increases the area of the read out circuit unit 230, resulting in decrease in yield. This also complicates the control by the control unit 40, which may increase the cost of the apparatus. Thus, the appropriate number of the systems is up to four with consideration for the above. According to the present embodiment, a configuration wherein the reset operation and the sampling and holding operation are performed in different timings is described. However, even in case that the reset operation may solely be in the different timings, the advantage of reducing the line noise can be obtained sufficiently. That is, only by dispersing the noise component introduced at the reset, the line noise reducing effect can be expected sufficiently.

Third Embodiment

Figure 9:
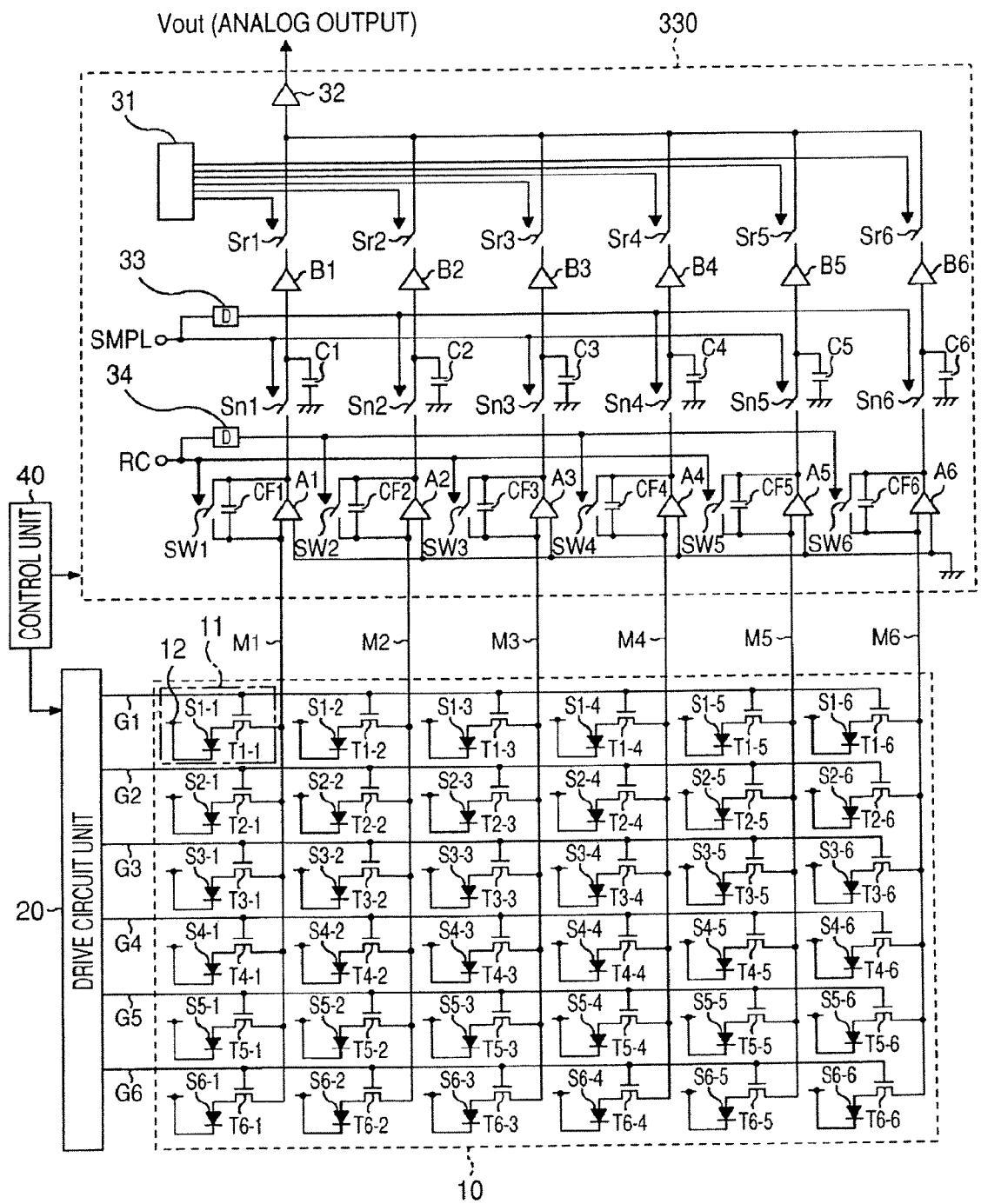
FIG. 9 is a schematic diagram of a radiation imaging apparatus (an X ray imaging apparatus) according to a third embodiment.

The third embodiment of the present invention is described below. FIG. 9 is a schematic diagram of a radiation imaging apparatus (an X ray imaging apparatus) according to the third embodiment. In FIG. 9, the same constituents as those of the first embodiment are denoted by the same reference characters and numbers, and detailed description thereof is omitted because functions thereof are the same as those described in the first embodiment.

The third embodiment is different from the first and the second embodiment in the configuration of the read out circuit unit 330. In the third embodiment, the inputs into the sampling and holding control signal and the reset control signal are taken to be a single respectively in contrast to the second embodiment illustrated in FIG. 7, and the sampling and holding control signal and the reset control signal are separated into two systems of the odd and the even channels respectively by using delay circuit units 33 and 34 provided inside the read out circuit unit 330. This needs only one kind of the sampling and holding signal (SMPL control signal) and the reset signal (RC control signal), which simplifies the control of the apparatus.

Figure 10:
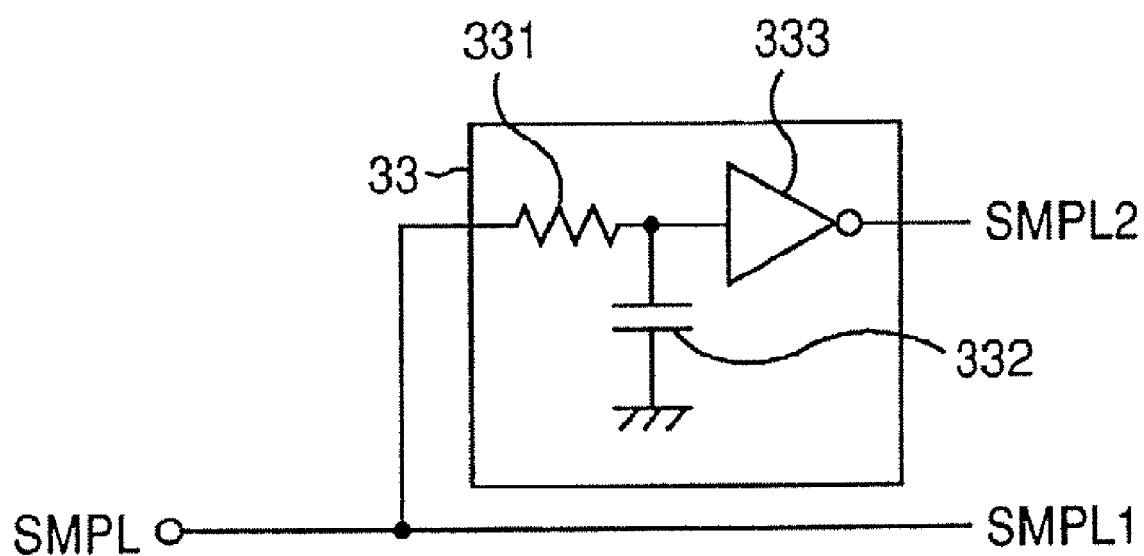
FIG. 10 is a schematic diagram illustrating one example of a detail internal configuration of the delay circuit unit illustrated in FIG. 9.
Figure 10:
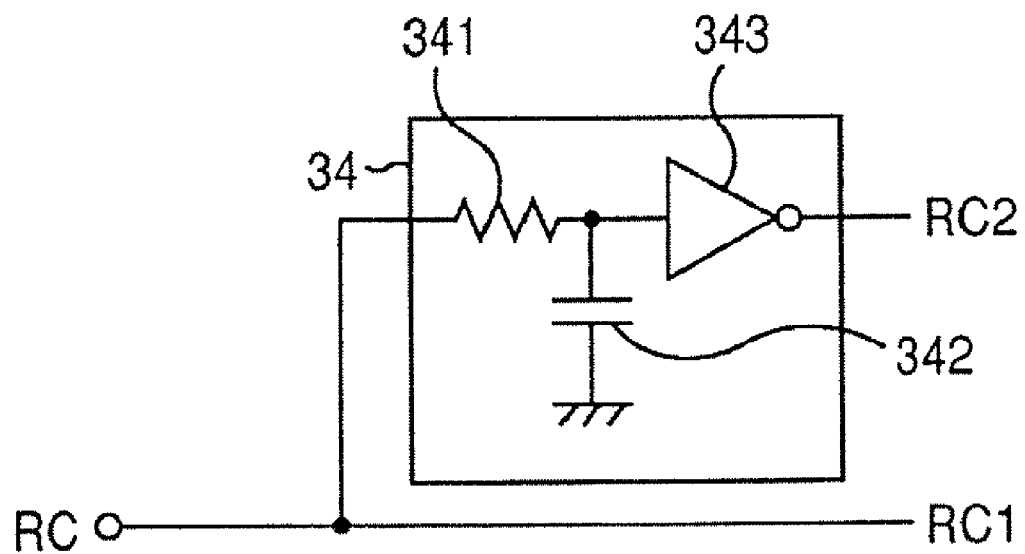

FIG. 10 is a schematic diagram illustrating of one example of a detail internal configuration of the delay circuit units 33 and 34 illustrated in FIG. 9. The delay circuit unit 33 includes a resistor 331, capacitive element 332 and buffer 333, and similarly the delay circuit unit 34 includes a resistor 341, capacitive element 342 and buffer 343.

The SMPL control signal input from the control unit 40 passes through a primary LPF formed of the resistor 331 and capacitive element 332, thereafter it is shaped into a rectangular wave by the digital buffer 333 and turns into the SMPL2 control signal in the second embodiment. On the other hand, the SMPL control signal input from the control unit 40 turns into the SMPL1 control signal in the second embodiment without processed as it is. The RC control signal input from the control unit 40 passes through a primary LPF formed of the resistor 341 and capacitive element 342, thereafter it is shaped into a rectangular wave by the digital buffer 343 and turns into the RC2 control signal in the second embodiment. On the other hand, the RC control signal input from the control unit 40 turns into the RC1 control signal in the second embodiment without processed as it is.

Figure 11:
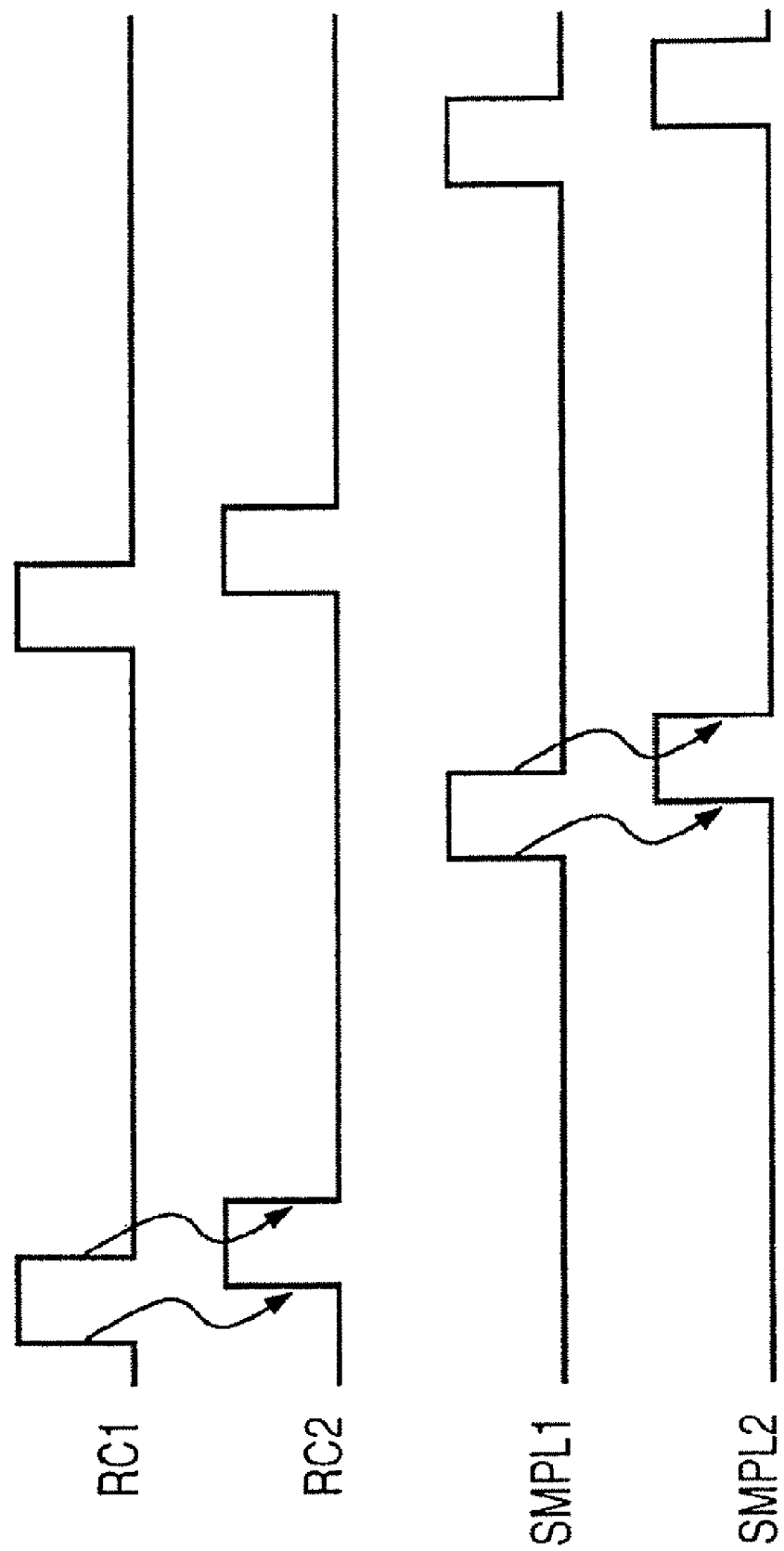
FIG. 11 is a timing chart of the sampling and holding signals (SMPL1 and SMPL2) and reset signals (RC1 and RC2) obtained by the delay circuit units.

FIG. 11 is a timing chart of the sampling and holding signals (SMPL1 and SMPL2) and reset signals (RC1 and RC2) obtained by the delay circuit units 33 and 34. In the present embodiment, as illustrated in FIG. 11, the delay circuit units 33 and 34 delay both rise and fall of the SMPL2 and the RC2 control signals with respect to the SMPL1 and the RC1 control signals.

Thus, providing the delay circuits 33 and 34 enables realizing the operation in the second embodiment illustrated in FIG. 8 although the sampling and holding signal (SMPL control signal) and the reset signal (RC control signal) input from the control unit 40 are a single respectively.

Fourth Embodiment

The fourth embodiment of the present invention is described below. The fourth embodiment provides a radiation imaging system including the radiation imaging apparatus according to the foregoing first to third embodiments. In other words, the radiation imaging system according to the fourth embodiment includes at least any of the radiation imaging apparatus according to the first to third embodiments and a radiation generating apparatus for emitting radiation (X rays) to the radiation detection unit 10 of the radiation imaging apparatus.

The units illustrated in FIGS. 1, 7 and 9 forming the radiation imaging apparatus according to the above embodiments and the steps illustrated in FIG. 3 to 6, 8 and 11 describing a method for driving the radiation imaging apparatus can be realized by operating the programs stored in a RAM and ROM of a computer. The programs and the computer readable storage media for storing the programs are included in the present invention.

Specifically, the programs are stored in storage media such as, for example, a CD-ROM or supplied to a computer via various transmission media. A flexible disk, hard disk, magnetic tape, magneto-optical disk and non-volatile memory card may be used as storage media for storing the programs in addition to the CD-ROM. On the other hand, communication media in a computer network system (LAN, WAN such as the Internet and radio communication network) for supplying program information to be propagated as a carrier can be used as transmission media for the programs. The communication media in this case include a wired line such as an optical fiber and a radio line.

The programs are included in the present invention for the cases where a computer executes a supplied program to realize functions of the radiation imaging apparatus according to the embodiments, the programs realize functions of the radiation imaging apparatus according to the embodiments in collaboration with an operating system (OS) or other application software operating in a computer, and a feature expansion board and a feature expansion unit of the computer perform all or part of processes of the supplied programs to realize functions of the radiation imaging apparatus according to the embodiments.

The present invention can be suitably used in an imaging apparatus, radiation imaging apparatus, a method for driving the same and a radiation imaging system suitably applicable to medical diagnosis and industrial non-destructive inspection.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-236449, filed Aug. 31, 2006, and No. 2007-217265, filed Aug. 23, 2007, which are hereby incorporated by reference herein in their entirety.

What is claimed is:

1. An imaging apparatus comprising:
    a detection unit including a plurality of pixels arranged in row and column directions, wherein each of the pixels includes a conversion element for converting incident radiation or incident light into an electric charge and a switch element for transferring an electric signal corresponding to the electric charge;
    a drive circuit unit for driving a plurality of the switch elements arranged in the row direction to transfer the electric signals in parallel from the pixels arranged in the row direction;
    a read-out circuit unit for reading out the electric signals in parallel, wherein the read-out circuit unit comprises a first sampling and holding circuit for performing a first sampling and holding operation to sample and hold an electric signal from pixels arranged along one column of the detection unit, and a second sampling and holding circuit for performing a second sampling and holding operation to sample and hold an electric signal from pixels arranged along another column of the detection unit; and
    a control unit for controlling the read-out circuit unit, wherein the control unit controls the first and second sampling and holding circuits, such that (1) a timing of starting the first sampling and holding operation is different from a timing of starting the second sampling and holding operation or (2) a timing of ending the first sampling and holding operation is different from a timing of ending the second sampling and holding operation, and such that (3) a first period of performing the first sampling and holding operation is partially overlapped with a second period of performing the second sampling and holding operation is partially overlapped.

2. The imaging apparatus according to claim 1, wherein the first sampling and holding circuit a first switch, and the second sampling and holding circuit a second switch, and
    the control circuit supplies a first control signal to the first switch, and supplies a second control signal to the second switch in a timing different from a timing of supplying the first control signal.

3. The imaging apparatus according to claim 1, further comprising a plurality of read-out wirings for transferring the electric signals from the plurality of pixels arranged in the column direction in parallel to the read out circuit unit,
    wherein the plurality of read-out wirings include
    a first read-out wiring arranged correspondingly to the first sampling and holding circuit and connected commonly to the pixels arranged along the one column, and
    a second read-out wiring arranged correspondingly to the second sampling and holding circuit and connected commonly to the pixels arranged along the another column.

4. The imaging apparatus according to claim 3, wherein the plurality of read-out wirings are classified into the a plurality of read-out wiring groups including
    a first read-out wiring group including the first read-out wiring, and
    a second read-out wiring group including the second read-out wiring.

5. The imaging apparatus according to claim 3, wherein the first read-out wiring group includes the read-out wirings arranged along even columns, and the second read-out wiring group includes the read-out wirings arranged along odd columns.

6. The imaging apparatus according to claim 3, wherein the read-out circuit unit includes a first integrator arranged between the first read-out wiring and the first sampling and holding circuit, a second integrator arranged between the second read-out wiring and the second sampling and holding circuit, a first reset unit for performing a first reset operation to reset a capacitor of the first integrator, and a second reset unit for performing a second reset operation to reset a capacitor of the second integrator, and the control unit controls the first and second reset units, such that a timing of starting the first reset operation is different from a timing of starting the second reset operation, or a timing of ending the first reset operation is different from a timing of ending the second reset operation.

7. The imaging apparatus according to claim 1, further comprising an output unit for outputting in time series the electric signal sampled and held by the first sampling and holding circuit and the electric signal sampled and held by the second sampling and holding circuit.

8. The imaging apparatus according to claim 1, wherein the conversion element comprises a phosphor converting incident radiation into light, and a photoelectric conversion element converting the light into the electric signal.

9. The imaging apparatus according to claim 8, wherein the photoelectric conversion element contains amorphous silicon as a main ingredient.

10. A radiation imaging system comprising:

an imaging apparatus according to claim 1; and a radiation generating source for emitting the radiation to the detection unit.

* * * * *